UNITED STATES PATENT OFFICE.

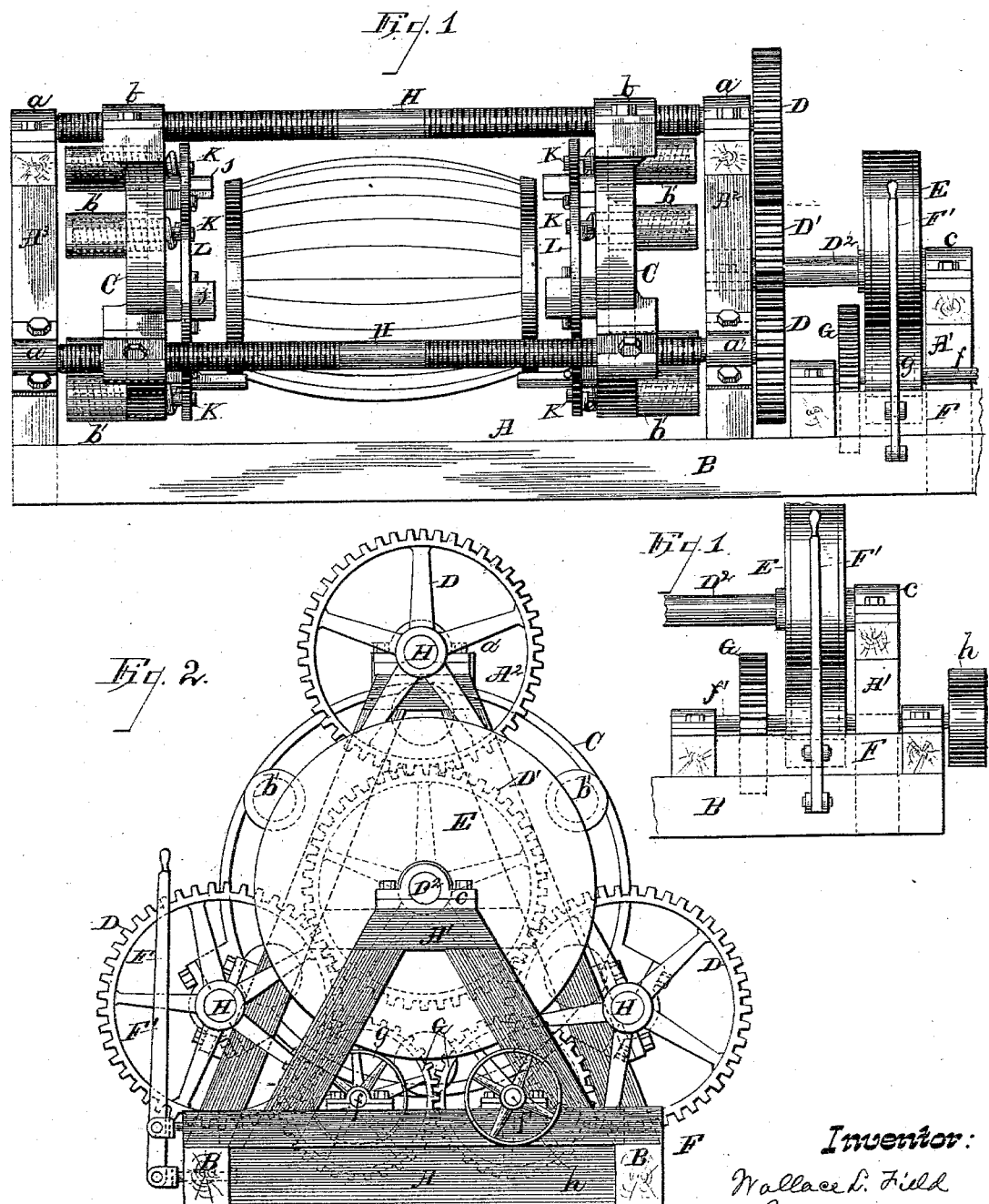

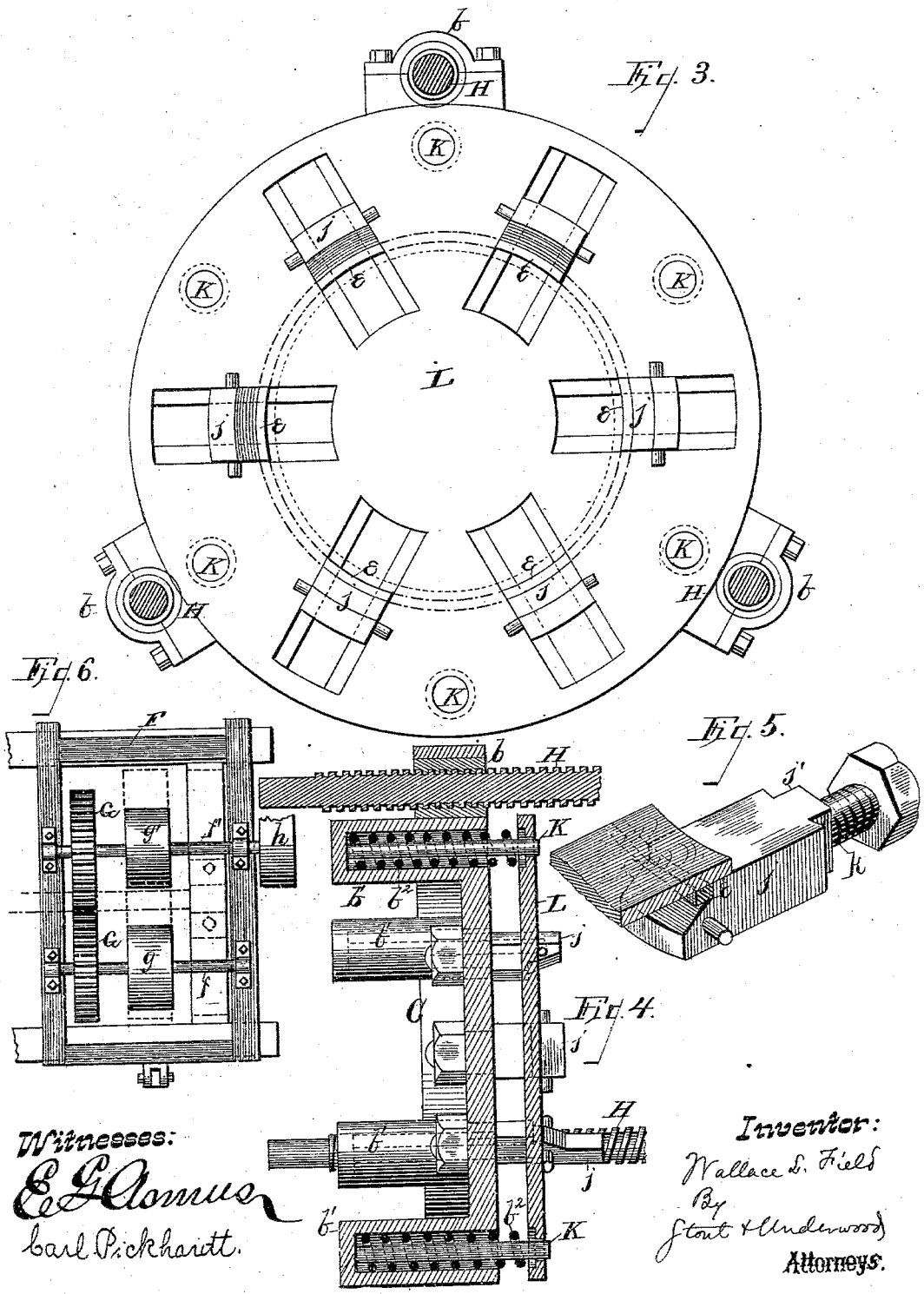

WALLACE L. FIELD, OF WEST DEPERE, WISCONSIN.

MACHINE FOR TRUSSING BARRELS.

SPECIFICATION forming part of Letters Patent No. 283,476, dated August 21, 1883.

Application filed March 21, 1882. (No model.)

*To all whom it may concern:*

Be it known that I, WALLACE L. FIELD, of West Depere, in the county of Brown, and in the State of Wisconsin, have invented certain new and useful Improvements in Machines for Trussing Barrels; and I do hereby declare that the following is a full, clear, and exact description thereof.

My invention relates to devices for trussing and leveling barrels, and will be fully described hereinafter.

In the drawings, Figure 1 is a broken side view of my device. Fig. 2 is an end view, and Figs. 3, 4, 5, and 6 are details.

A is the frame, one end of which is provided with trusses A' A², and the other end with a truss, A³. The trusses A² and A³ carry the bearings $a$ $a$ of right and left screw-rods H, and these rods pass through threaded bearings $b$ in disks C, and extend through the bearings $a$, to receive cog-wheels D D D, that are connected by a central cog-wheel, D', the shaft D² of which has a bearing, $c$, in the apex of truss A', and another in the cross-beam of truss A², as shown in dotted lines, Fig. 1.

E is a friction-wheel, keyed to shaft D², just outside of cog-wheel D', and this hangs just above the center of a slide, F, in which are journaled shafts $f$ $f'$, that carry, respectively, small friction-wheels $g$ $g'$, and each a gear-wheel, G, and on the outer end of shaft $f'$, I key a pulley, $h$, that drives the shaft $f'$, and through it and the gear-wheels G drives the shaft $f$ and its friction-wheel $g$.

A belt from any source of power may be slipped on pulley $h$, which, when the slide F is in position to hold wheels $g$ $g'$ both out of contact with the periphery of wheel E, will turn them without affecting any of the rest of the machine; but should slide F be shoved in by lever F' until pulley $g$ comes in contact with the large wheel E, then it will revolve it and cause the gear-wheel D' to simultaneously revolve all of the wheels D on the shafts H, and as they are both right and left and work in screw-threaded bearings in the disks, they will draw the disks toward each other, for a purpose hereinafter to be explained; then if, by drawing on lever F', the slide be shifted until the wheel $g$ is drawn out of contact with the wheel E and the wheel $g'$ thrown into contact with it, the wheel $g'$, acting upon the face of wheel E, will turn it in an opposite direction, when it will reverse gear-wheels D and their shafts and cause them to separate the chucks. The slide F and its wheels are shown in plan in Fig. 6, as the pulley $h$ completely hides the wheel $g'$ in Fig. 2.

The disks C, that travel on the right and left screw-rods H, are provided with pockets $b'$, in the center of which I secure spindles K, that project out a short distance to receive another disk, L, and I place above each of the spindles K a spiral spring, $b''$, up against which the disk L rests. I then project through slots in both of the disks a series of trussing-plugs, $j$—such as the one shown in perspective in Fig. 5—the squared portion $j'$ adapted to slide in and out in the slots in the disk L, and the rounded portion $k$ adapted to slide in the slots in disk C and threaded to receive a nut, by which it is tightened in its adjustment. The front ends of the trussing-plugs $j$ are beveled off to receive the ends of the staves and center them, and have shoulders $e$, that, abutting against the hoops, force them on the barrel as the disks are drawn together, and the disks L yield to permit the advance of the plugs, though they afford sufficient resistance to force projecting staves in and make them even with each other while the hoops are being tightened to place. I extend the points of the two lower plugs, $j$, out beyond their bevels, so that they may serve as skids for supporting the barrel before the disks have been sufficiently advanced toward each other to carry the bevels against the ends of the staves. I also pass bolts transversely through the plugs $j$, after the disk L has been put in position, to prevent the disk from being forced off by its springs.

I am aware that a sliding disk has been used for forcing the head in barrels while hoops are being put on; but my disks L are not for this purpose, and I do not claim them broadly. I am also aware that adjustable friction-wheels are old for changing the direction of the motion in revolving shafts, and this I do not claim broadly; but What I do claim, and desire to secure by Letters Patent, is—

1. The combination, with a disk having pockets $b$, each forming a housing for a spring and spindle, of a sliding disk, L, and trussing-plugs, as set forth.

2. The combination of the disks carrying the trussing-plugs, right and left hand screw-rods, carrying each a gear-wheel, a shaft carrying a gear-wheel connecting those of the screw-rods, and a friction-wheel, with a slide carrying connected friction-wheels, the shaft of one of which carries a driving-pulley.

3. The combination, with the trussing-head, of the lower trussing-plugs having inclines, as described, and extensions beyond the inclines to support a barrel, substantially as set forth.

4. The combination, with a trussing-head carrying trussing-plugs, of a yielding disk through which the trussing-plugs extend, substantially as set forth.

5. The trussing-head C, in combination with the yielding disk L, trussing-plugs $j$, secured to the head C and extending through disk L, and securing-pins, substantially as set forth.

In testimony that I claim the foregoing, I have hereunto set my hand this 28th day of February, 1882.

WALLACE L. FIELD.

Witnesses:
S. S. STOUT,
HAROLD G. UNDERWOOD.